(12) United States Patent
Giles et al.

(10) Patent No.: US 8,868,282 B2
(45) Date of Patent: Oct. 21, 2014

(54) DIAGNOSTIC SYSTEM AND METHOD FOR PROCESSING CONTINUOUS AND INTERMITTENT FAULTS

(75) Inventors: Peter John Giles, Ypsilanti, MI (US); John F. Van Gilder, Webberville, MI (US)

(73) Assignee: GM Global Technology Operations LLC

( * ) Notice: Subject to any disclaimer, the term of this patent is extended or adjusted under 35 U.S.C. 154(b) by 133 days.

(21) Appl. No.: 13/613,814

(22) Filed: Sep. 13, 2012

(65) Prior Publication Data
US 2014/0025249 A1    Jan. 23, 2014

Related U.S. Application Data

(60) Provisional application No. 61/673,478, filed on Jul. 19, 2012.

(51) Int. Cl.
*G01M 17/00* (2006.01)

(52) U.S. Cl.
USPC ........................................... 701/29.2

(58) Field of Classification Search
CPC ....... G06F 17/00; G06F 11/30; B62D 5/0463; B62D 6/00
USPC .......... 701/29.2, 29.1, 39, 42–44, 29.9, 31.3, 701/32.1, 34.4
See application file for complete search history.

(56) References Cited

U.S. PATENT DOCUMENTS

| | | | | |
|---|---|---|---|---|
| 4,608,638 A * | 8/1986 | Tsikos | ......................... | 701/32.1 |
| 5,790,427 A * | 8/1998 | Greer et al. | .................... | 702/127 |
| 6,192,302 B1* | 2/2001 | Giles et al. | .................... | 701/29.6 |
| 6,393,347 B1* | 5/2002 | Snyder et al. | ................. | 701/33.4 |
| 7,089,096 B2* | 8/2006 | Liebl et al. | .................... | 701/33.4 |
| 8,180,517 B2* | 5/2012 | Giles | ............................ | 701/29.1 |
| 2004/0172177 A1* | 9/2004 | Nagai et al. | .................... | 701/29 |
| 2007/0076312 A1* | 4/2007 | Jordan | ............................ | 360/32 |
| 2008/0235172 A1* | 9/2008 | Rosenstein et al. | ............ | 706/46 |

* cited by examiner

*Primary Examiner* — Helal A Algahaim
*Assistant Examiner* — Shardul Patel (57) ABSTRACT

A method for diagnosing a device of a vehicle, includes: generating samples of a parameter of the device; indicating whether each of the samples passed or failed based on comparisons of the samples with one of a predetermined value and a predetermined range; tracking a first number of consecutive samples compared, a second number of the first number of samples that failed, a third number of the first number of samples that failed consecutively, and a fourth number of a last predetermined number of samples compared that failed; selecting one of a normal control mode, a temporary default action mode and a permanent default action mode based on the first, second, third, and fourth numbers; and selectively setting a diagnostic trouble code (DTC) in memory when in the permanent default action mode.

21 Claims, 4 Drawing Sheets

DIAGNOSTIC SYSTEM AND METHOD FOR PROCESSING CONTINUOUS AND INTERMITTENT FAULTS

CROSS-REFERENCE TO RELATED APPLICATIONS

This application claims the benefit of U.S. Provisional Application No. 61/673,478, filed on Jul. 19, 2012. The disclosure of the above application is incorporated herein by reference in its entirety.

This application is related to U.S. patent application Ser. No. 12/698,436, filed on Feb. 2, 2010, which issued as U.S. Pat. No. 8,180,517. The disclosures of the above application and the above patent are incorporated herein by reference in their entirety.

FIELD

The present disclosure relates to diagnostic systems and methods and more particularly to diagnostic systems and methods for devices of vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle electronic control systems, such as engine control systems and transmission control systems, use electrical and electromechanical/hydraulic/pneumatic devices to monitor operating conditions and to adjust operation. As vehicle control systems have increased in size and complexity, the speed and precision for controlling and monitoring the devices has also increased. The vehicle control systems usually include diagnostic systems that determine whether the devices (e.g., devices generating input signals and output devices) are functioning as designed. Demands on the diagnostic systems have increased as the vehicle control systems have become more complex. A requirement of vehicle diagnostic systems may be quick and accurate detection of critical type faults, including both continuous and intermittent faults, in order to maintain reliable operation of the control system.

Functional performance requirements of a vehicle control system or a particular subsystem and its components may vary. For example, the diagnostic system may be required to detect and respond to an electrical fault of a first device or first input signal in less than 50 milliseconds to maintain and stabilize operation of the control system. Other input signals or output devices may allow diagnosis and response over longer or shorter intervals.

A diagnostic system may be designed to detect and respond to a continuous (non-intermittent) fault that is present for a predetermined period, such as 5 seconds or longer. When the fault is present for at least the predetermined period, the diagnostic system sets a Diagnostic Trouble Code (DTC) to inform the operator that a failure has occurred and that the vehicle requires service. When the DTC is set, the diagnostic system performs failure mode management action(s) to protect the system or subsystem. The failure mode management action(s) taken when the DTC is set is referred to as a permanent default action since the action(s) is/are performed as long as the DTC is set. A DTC is unique for each individual fault and is used to direct a vehicle service/repair to help efficiently identify the root cause of the failure. The DTC is also used to alert a user, via one or more tactile (e.g., visual, audio, etc.) indications that a fault has occurred and to seek vehicle service.

Requiring the fault to be continuous and present for longer periods of time (for example only, 5 to 10 seconds) allows the diagnostic system to reduce the likelihood that a false failure has occurred or that the fault is intermittent. False failures and intermittent faults may increase warranty costs and decrease customer satisfaction. A false failure may occur when the diagnostic system indicates that a fault is present when no actual fault is present and/or sets a DTC prematurely when the fault has been intermittent. Prematurely setting a DTC can limit operation of the vehicle control system and therefore cause customer inconvenience. Prematurely setting a DTC may also increase warranty costs because a vehicle service technician may be unable to identify the root cause of the fault.

Intermittent faults are transitory and can be short in duration, random, erratic, non-repeatable, and/or repeatable. Intermittent faults are now considered critical faults because they may be detrimental to proper operation of a complex control system. It is no longer a matter of preference as to whether a diagnostic system takes or does not take failure mode management action(s) in response to intermittent faults. Diagnostic systems must therefore identify and quantify intermittent faults with minimal (e.g., zero) delay or latency in order to take appropriate failure mode management action(s) at the ideal time.

Detection and quantification of intermittent faults can increase false passes and/or false failures. A false pass may occur when the diagnostic system is unable to identify the presence of a fault that is actually present. False passes may prevent one or more failure mode management actions from being taken to maintain reliable operation. Accurate detection and response to various intermittent faults will reduce false passes.

A diagnostic system may measure the frequency and duration of intermittent faults in order to determine whether the fault may be detrimental to the reliable operation of the control system. If the fault may be detrimental to the reliable operation of the control system, the diagnostic system may take the failure mode management action(s) during an interim period before the DTC is set to protect the control system. The failure mode management action(s) taken during the interim period before the DTC is set may be referred to as temporary default actions as they may be deactivated arbitrarily.

A repeatability of the fault may be determined based on the duration and/or frequency of an intermittent fault. A repeatable intermittent fault, and particularly intermittently occurring critical faults, may be managed similarly to continuous critical faults. When an intermittent fault is repeatable or becomes continuous, the diagnostic system should set the DTC and permanent default action(s) should be taken. Intermittent faults that are repeatable may be repairable because as the likelihood that the root cause can be determined increases. If a fault is not sufficiently repeatable, temporary default action(s) may be removed and normal operation of the control system may be resumed.

SUMMARY

A sampling module generates samples of a parameter of the device. A diagnostic control module indicates whether each of the samples passed or failed based on comparisons of the samples with one of a predetermined value and a predetermined range. A counter module tracks a first number of consecutive samples compared, a second number of the first number of samples that failed, a third number of the first number of samples that failed consecutively, and a fourth number of a last predetermined number of samples compared that failed. The diagnostic control module selects one of a normal control mode, a temporary default action mode and a permanent default action mode based on the first, second, third, and fourth numbers, transitions from the normal control mode to the temporary default action mode and takes a temporary default action based on at least one of the third and fourth numbers; transitions to the permanent default action mode and takes a permanent default action based on at least one of the first, third, and fourth numbers; and selectively sets a diagnostic trouble code (DTC) in memory when in the permanent default action mode.

A method for diagnosing a device of a vehicle, includes: generating samples of a parameter of the device; indicating whether each of the samples passed or failed based on comparisons of the samples with one of a predetermined value and a predetermined range; tracking a first number of consecutive samples compared, a second number of the first number of samples that failed, a third number of the first number of samples that failed consecutively, and a fourth number of a last predetermined number of samples compared that failed; selecting one of a normal control mode, a temporary default action mode and a permanent default action mode based on the first, second, third, and fourth numbers; transitioning from the normal control mode to the temporary default action mode and taking a temporary default action based on at least one of the third and fourth numbers; transitioning to the permanent default action mode and taking a permanent default action based on at least one of the first, third, and fourth numbers; and selectively setting a diagnostic trouble code (DTC) in memory when in the permanent default action mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A diagnostic system and method of the present application diagnoses an electronic device of a control system of a vehicle based on a plurality of test data samples ("samples") of a parameter. The diagnostic system and method compares each sample with one of a predetermined value and a predetermined range to determine whether that sample passes or fails.

The diagnostic system and method tracks a first number of consecutive samples compared (including samples that passed and samples that failed), a second number of the first number of samples that failed, and a third number of the first number of samples that failed consecutively. The diagnostic system and method also tracks a fourth number of a last predetermined number of samples that failed and a fifth number of samples that passed since a last sample failed. Indicators for each of the last predetermined number of the samples are stored in a data buffer in memory and indicate whether the samples passed or failed, respectively. The fourth number is determined based on the data in the data buffer. The diagnostic system and method selects one of a normal control mode, a temporary default action mode, and a permanent default action mode based on at least one of the first, second, third, fourth, and fifth numbers.

For purposes of illustration, the present disclosure will be described in the context of an example vehicle control system for an internal combustion engine. However, the present disclosure is also applicable to other types of control systems.

Figure 1:
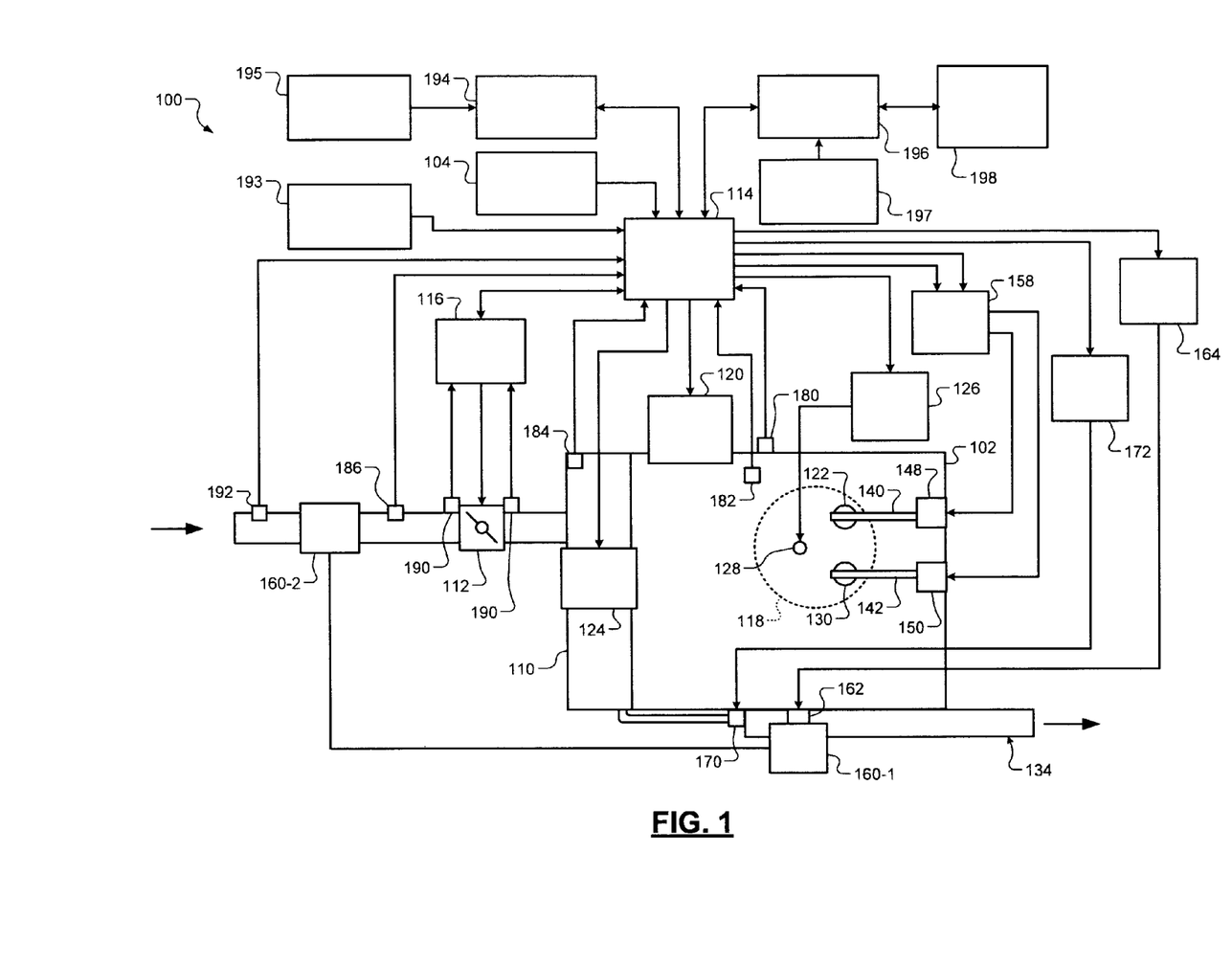
FIG. 1 is a functional block diagram of an example vehicle control system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders. Generating the spark may be referred to as a firing event. The spark actuator module 126 may have the ability to vary the timing of the spark for each firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic valve actuators, electrohydraulic actuators, or another suitable type of valve actuator.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve actuation may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. One or more other sensors 193 may also be implemented. The ECM 114 may use signals from sensors to make control decisions for the engine system 100.

The ECM 114 may communicate with a transmission control module 194, for example, to coordinate gear shifts within a transmission (not shown). For example, the ECM 114 may reduce engine torque during a gear shift. The transmission control module 194 may receive signals from one or more sensors 195, such as one or more speed sensors, one or more pressure sensors, one or more torque sensors, one or more temperature sensors, and/or one or more transmission related sensors.

The ECM 114 may communicate with a hybrid control module 196, for example, to coordinate operation of the engine 102 and an electric motor 198. The hybrid control module 196 may receive signals from one or more sensors 197, such as one or more speed sensors, one or more pressure sensors, one or more torque sensors, one or more temperature sensors, one or more voltage sensors, one or more current sensors, and/or one or more other hybrid related sensors. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator, and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the spark timing. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control the actuator values in order to cause the engine 102 to generate a desired engine output torque.

Figure 2:
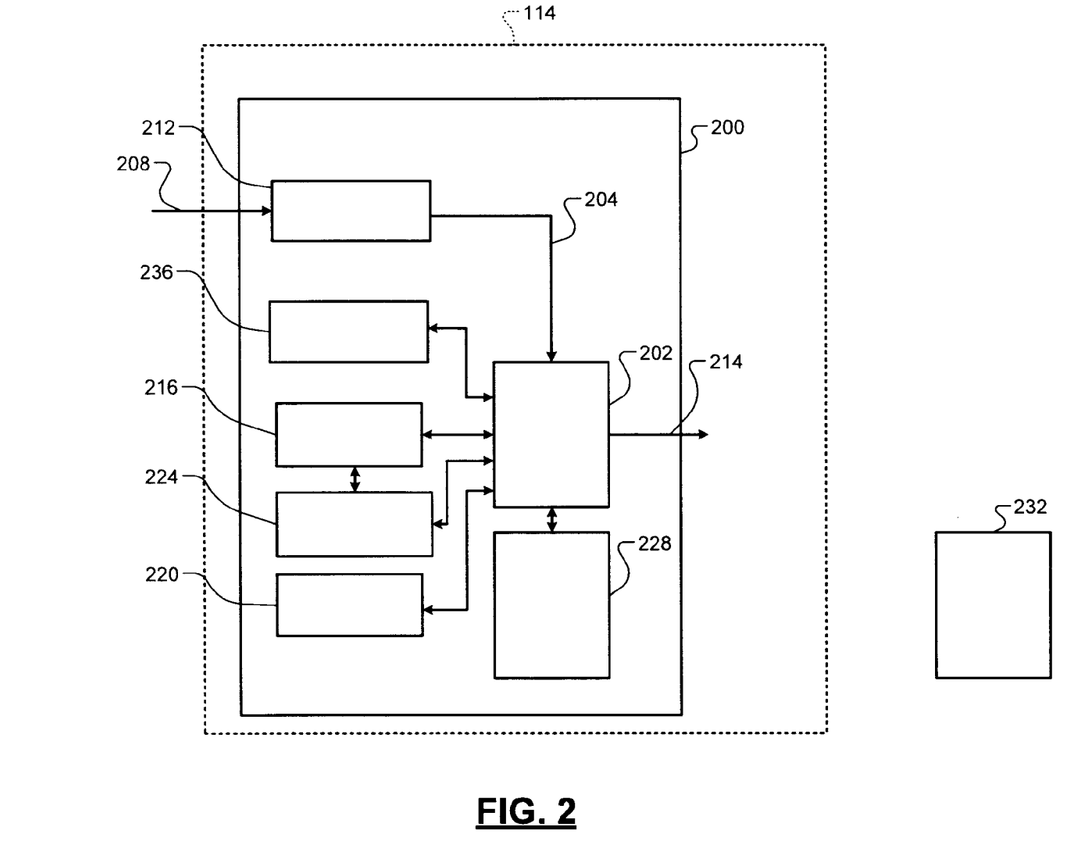
FIG. 2 is a functional block diagram of an example control module of a vehicle control system according to the present disclosure.

Referring now to FIG. 2, a functional block diagram of a fault diagnostic module 200 is presented. While the fault diagnostic module 200 is shown as being implemented within the ECM 114, the fault diagnostic module 200 may be implemented within another module, such as the transmission control module 194, the hybrid control module 196, another module of the vehicle, or independently.

A diagnostic control module 202 tests samples 204 of a parameter 208 to determine whether a fault is present in an electronic device (e.g., a sensor or an actuator) of a control system. The fault may include, for example, an open circuit fault, a short-to-ground fault, a short-to-power fault, or another type of fault.

The diagnostic control module 202 determines whether each of the samples 204 are indicative of the fault (a fail sample) or not indicative of the fault (a pass sample). A sampling module 212 samples the parameter 208 at a sampling rate to produce the samples 204. The sampling module 212 may also filter, buffer, digitize, and/or perform one or more other processing functions.

The diagnostic control module 202 determines whether to set a DTC that is associated with the fault based on the samples 204. More specifically, the diagnostic control module 202 determines whether to set the DTC based on various counter values, timer values, and calibration values. The diagnostic control module 202 also sets a control mode 214 for the control system of the vehicle based on the counter values, the timer values, and the calibration values. The control mode 214 may be set to a normal control mode, a temporary default action (TDA) mode, or a permanent default action (PDA) mode at a given time.

One or more temporary default actions may be taken to control the control system when the control mode 214 is set to the TDA mode. One or more permanent default actions may be taken to control the control system when the control mode 214 is set to the PDA mode. The permanent default action(s) may be the same as or different than the temporary default action(s). The permanent default action(s) are taken, however, when the DTC is set.

The control system may be a simple control system (e.g., passenger cabin climate control system, window control system, etc.) or a complex control system (e.g., transmission control system, engine control system, etc.). The fault may be referred to as a critical fault or a noncritical fault. Critical faults include faults that may adversely affect reliable operation of the control system when the fault is present for more than a predetermined period, such as 100 milliseconds or more. All faults that do not qualify as critical faults may be referred to as non-critical faults. Faults may also be continuous or intermittent. Intermittent faults can be repeatable, non-repeatable, semi-continuos, random, erratic, etc.

A counter/timer module 216 tracks the counter values and/or the timer values, as will be discussed below. Timers and counters can be used interchangeably. Further, while both counters and timers will be discussed, only counters could be used or only timers could be used. The calibration values are stored and provided by a calibration module 220, as will also be discussed below.

The counters include a fail sample counter ($X1^{CTR}$), a total sample counter ($Y1^{CTR}$), a continuous intermittent fault (CIF) counter ($CIF^{CTR}$), a random intermittent, fault (RIF) counter ($RIF^{CTR}$) a time since last fault (TSLF) counter ($TSLF^{CTR}$), and a temporary default action (TDA) counter ($TDA^{CTR}$). The fail sample counter tracks the number of fail samples accumulated during one sample set of a predetermined number of samples. The predetermined number of samples (Total Sample Size) is calibrated and stored as one of the calibration values. For example only, the predetermined number of samples may be approximately 10 to 20 times the sampling rate. The fail sample counter is used to determine when to set the DTC and when to clear the DTC. The total sample counter tracks the total number of samples tested (both pass samples and fail samples). The CIF counter tracks the number of successive (continuous or consecutive) fail samples at any point in time. In other words, at a given time, the CIF counter tracks the number consecutive samples that were determined to be fail samples.

A sliding window buffer 224 includes a (memory) data buffer of a predetermined size (for a predetermined number of entries). The predetermined size is calibrated and stored as one of the calibration values. The data buffer may include, for example, a ring buffer, a first-in first-out buffer, or a circular buffer. The data buffer includes a stream or flow of chronologically ordered data that represents a moving window in time that includes data for the most recent predetermined number of samples. When a sample is determined to be a pass sample or a fail sample, an indicator of whether the sample is a pass sample or a fail sample may be stored in the data buffer and an indicator associated with an oldest sample stored in the data buffer may be removed from the data buffer. The RIF counter tracks the number of samples, out of the last predetermined number of samples tested (the predetermined number being the size of the data buffer), that were fail samples.

The TSLF counter tracks the number of successive (continuous or consecutive) pass samples tested at a given time. In other words, the TSLF counter tracks the number of successive samples tested since a sample was last determined to be a fail sample. The TDA counter tracks the number of times that control transitioned from the normal control mode to the TDA mode during a predetermined period, such as one key cycle. One key cycle may refer to the period between when the electronic components of the vehicle are powered up pursuant to a vehicle startup (e.g., key ON) and when the electronic components of the vehicle are powered down pursuant to a vehicle shutdown (e.g., key OFF). The timers include a TDA mode timer ($S2^{TMR}$). The TDA mode timer tracks the period of operation in the TDA mode.

Figure 3A:
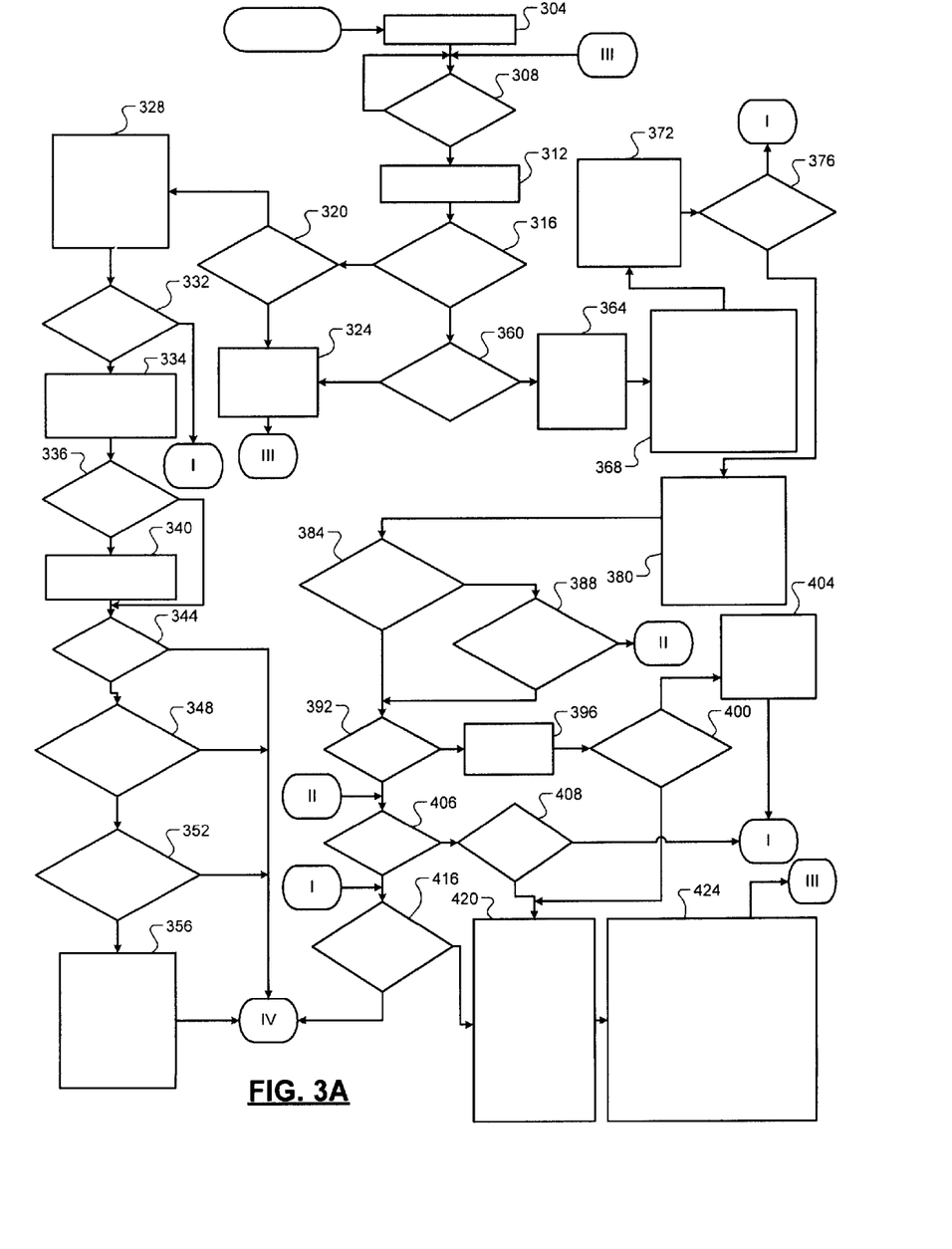
FIGS. 3A-3B include a flowchart depicting an example method of diagnosing and responding to continuous and intermittent faults according to the present disclosure.
Figure 3B:
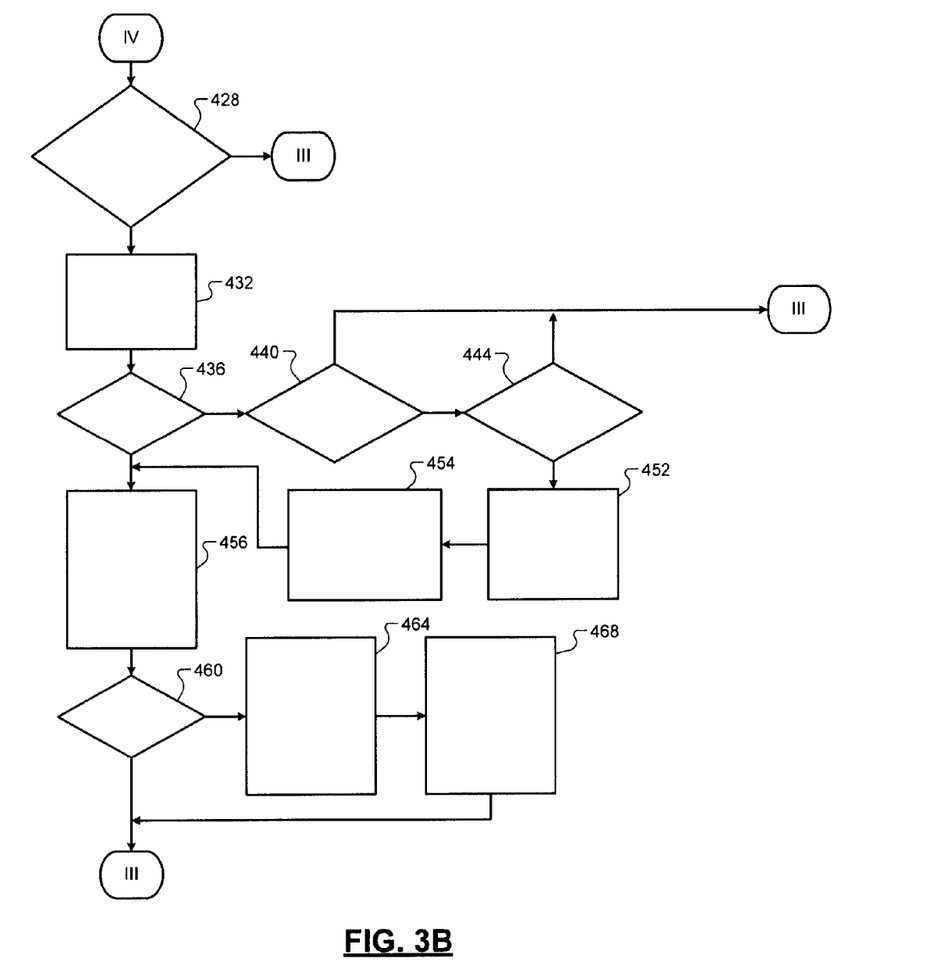

FIGS. 3A and 3B include a flowchart depicting an example method of diagnosing and responding to a fault including both continuous and intermittent types of the fault. Control may begin, for example, when a user starts the vehicle (e.g., via an ignition key). Referring now to FIGS. 2 and 3A, control may begin with 304 where the fault diagnostic is initialized. For example, the diagnostic control module 202 may initialize the data buffer of the sliding window buffer module 224 with indicators of pass samples (e.g., ones) and reset the timers and counters to zero at 304. One or more other initialization actions may also be taken.

At 308, the diagnostic control module 202 may determine whether one or more enabling or entry conditions for the fault diagnostic are satisfied. If true, control may continue with 312. If false, control may remain at 308. At 312, the diagnostic control module 202 obtains one of the samples 204.

The diagnostic control module 202 determines whether the one of the samples 204 is fail sample or a pass sample at 316.

The diagnostic control module 202 uses a threshold-based or range-based determination at 316 to determine whether the sample is a fail sample or a pass sample. For example, the diagnostic control module 202 may determine whether the sample is greater than a predetermined value, less than a predetermined value, within a predetermined range, or outside of a predetermined range at 316. If the sample is determined to be a fail sample, control continues with 360, which is discussed further below. If the sample is determined to be a pass sample, control continues with 320.

At 320, the diagnostic control module 202 determines whether a last test pass signal (or status) is set to a first state (e.g., 1). If true, the diagnostic control module 202 sets a loop status signal (or status) to a first state (e.g., 1) at 324, and control returns to 308. If false, control continues with 328. The last test pass signal is discussed further below.

At 328, the counter/timer module 216 increments the total sample counter ($Y1^{CTR}$). At 328, the diagnostic control module 202 also sets a last test fail signal (or status) to a second state (e.g., 0) and sets the loop status signal to a second state (e.g., 0). The last test fail signal is also discussed further below.

The diagnostic control module 202 determines whether a TDA enabled signal (or status) is set to a first state (e.g., 1) at 332. If true, the counter/timer module 216 increments the TSLF counter ($TSLF^{CTR}$) and resets the CIF counter ($CIF^{CTR}$) at 334, and control continues with 336. If false, the TDA enabled signal is set to a second state (e.g., 0), and control transfers to 416 as discussed further below. The state of the TDA enabled signal indicates whether taking temporary default action(s) (via operation in the TDA mode) is enabled for the fault. The TDA enabled signal being set to the first state indicates that temporary default action(s) may be taken. The TDA enabled signal may be set to the first state, for example, for processing a critical fault. The TDA enabled signal being set to the second state indicates that no temporary default action(s) are to be taken. The TDA enabled signal may be set to the second state, for example, for processing a non-critical fault. The TDA enabled signal is one of the calibrated values.

At 336, the diagnostic control module 202 determines whether the RIF counter ($RIF^{CTR}$) is greater than zero. If true, the counter/timer module 216 processes the RIF counter at 340, and control continues with 344. Processing the RIF counter includes incrementing the RIF counter if the sample tested at 316 was judged to be a fail sample or maintaining (i.e., not changing) the RIF counter if the sample tested at 316 was judged to be a pass sample. Processing the RIF counter also includes decrementing the RIF counter if the oldest sample in the data buffer (i.e., the sample that should no longer be considered) was judged to be a fail sample or maintaining the RIF counter if the oldest sample in the data buffer was judged to be pass sample. If 336 is false, control skips 340 and transfers to 344. In this manner, processing of the data in the data buffer (i.e., processing the RIF counter) is only performed when one or more fail samples were received and the RIF counter is greater than zero. The RIF counter being greater than zero indicates that the data buffer includes at least one fail sample. This may increase computational efficiency by avoiding unnecessary processing of the RIF counter when not needed under the circumstances.

The diagnostic control module 202 determines whether the control mode 214 is currently the TDA mode. If so, control continues with 348. If false, control transfers to 428 (FIG. 3B), which is discussed further below. At 348, the diagnostic control module 202 determines whether the TSLF counter ($TSLF^{CTR}$) is greater than or equal to a first predetermined TDA exit value (S2 Exit CIF MIN). The first predetermined TDA exit value corresponds to a minimum number of consecutive pass samples for transitioning from the TDA mode to the normal control mode. The first predetermined TDA exit value may be greater than the size of the data buffer. The first predetermined TDA exit value is one of the calibration values. If 348 is true, control continues with 352. If false, control transfers to 428 (FIG. 3B), which is discussed further below.

The diagnostic control module 202 determines whether the RIF counter ($RIF^{CTR}$) is less than a second predetermined TDA exit value (S2 Exit RIF MAX) at 352. The second predetermined TDA exit value corresponds to a maximum number of failure samples within the data buffer (i.e., a maximum value of the RIF counter) for transitioning from the TDA mode to the normal control mode. The second predetermined TDA exit value is one of the calibration values. If 352 is true, control continues with 356. If false, control transfers to 428 (FIG. 3B), which is discussed further below.

At 356, the diagnostic control module 202 transitions the control mode 214 from the TDA mode to the normal control mode. Normal control of the control system is then resumed. Additionally, the counter/timer module 216 stops the TDA mode timer ($S2^{TMR}$) and resets the TDA mode timer to zero at 356. Control then continues with 428 (FIG. 3B), which is discussed further below.

Referring back to 360 (i.e., when the sample is judged to be a fail sample at 316), the diagnostic control module 202 determines whether the last test fail signal is set to a first state (e.g., 1). If true, the diagnostic control module 202 sets the loop status signal to the first state at 324, and control returns to 308. If false, the last test fail signal is in the second state, and control continues with 364. The last test fail signal is discussed further below.

At 364, the counter/timer module 216 increments the fail sample counter ($X1^{CTR}$). If the fail sample counter is equal to 1, the counter/timer module 216 sets the total sample counter ($Y1^{CTR}$) equal to one at 368. If the fail sample counter is not equal to 1, the counter/timer module 216 increments the total sample counter at 368. By setting the total sample counter to 1 when a first fail sample is received, PDA can be taken and the DTC can be set sooner when the fault is present.

At 372, the diagnostic control module 202 sets the last test pass signal to the second state and sets the loop status signal to the second state. The diagnostic control module 202 determines whether the TDA enabled signal is set to the first state at 376. If true, control continues with 380. If false, the TDA enabled signal is set to the second state, and control transfers to 416, which is discussed further below. As described above, the state of the TDA enabled signal indicates whether taking temporary default action(s) (via operation in the TDA mode) is enabled for the fault.

The counter/timer module 216 resets the TSLF counter ($TSLF^{CTR}$) and increments the CIF counter ($CIF^{CTR}$) at 380. Additionally, the counter/timer module 216 processes the RIF counter at 380. As described above, processing the RIF counter includes incrementing the RIF counter if the sample tested at 316 was judged to be a fail sample or maintaining the RIF counter if the sample tested at 316 was judged to be a pass sample. Processing the RIF counter also includes decrementing the RIF counter if the oldest sample in the data buffer was judged to be a fail sample or maintaining the RIF counter if the oldest sample in the data buffer was judged to be pass sample.

At 384, the diagnostic control module 202 determines whether the CIF counter is greater than a first predetermined maximum value (S1 CIF MAX). If true, control continues with 392. If false, control continues with 388. The first predetermined maximum value corresponds to a predetermined maximum number of consecutive fail samples for transitioning from the normal mode to the TDA mode. The first predetermined maximum value is one of the calibration values.

The diagnostic control module 202 determines whether the RIF counter ($RIF^{CTR}$) is greater than a second predetermined maximum value (S1 RIF MAX). If true, control continues with 392. If false, control transfers to 406, which is discussed further below. The second predetermined maximum value corresponds to a predetermined maximum number of random intermittent fail samples for transitioning from the normal mode to the TDA mode. The second predetermined maximum value is one of the calibration values.

At 392, the diagnostic control module 202 determines whether the control mode 214 is the normal control mode. If true, control continues with 396. If false, the control mode 214 is the TDA mode or the PDA mode, and control continues with 406, which is discussed further below. The counter/timer module 216 increments the TDA counter ($TDA^{CTR}$) at 396, and control continues with 400.

The diagnostic control module 202 determines whether the TDA counter is greater than or equal to a third predetermined maximum value (TDA MAX) at 400. If true, control transfers to 420, which is discussed further below. If false, control continues with 404. The third predetermined maximum value corresponds to a maximum number of transitions from the normal control mode to the TDA mode during the predetermined period (e.g., one key cycle) before transitioning to the PDA mode and setting the DTC. The third predetermined maximum value is one of the calibration values. At 404, the diagnostic control module 202 sets the control mode 214 to the TDA mode, and the temporary default action(s) are taken. The counter/timer module 216 also starts the TDA mode timer ($S2^{TMR}$) at 404. Control continues with 416 after 404.

At 406, the diagnostic control module 202 determines whether the control mode 214 is the TDA mode. If true, control continues with 408. If false, control continues with 416, which is discussed further below. At 408, the diagnostic control module 202 determines whether the TDA mode timer ($S2^{TMR}$) is greater than a predetermined maximum TDA period. If true, control continues with 420, which is discussed further below. If false, control continues with 416. The predetermined maximum TDA period corresponds to a maximum period of use of the TDA mode during the predetermined period (e.g., one key cycle) before transitioning to the PDA mode and setting the DTC. The predetermined maximum TDA period is one of the calibration values.

At 416, the diagnostic control module 202 determines whether the fail sample counter ($X1^{CTR}$) is greater than a fourth predetermined maximum value at 416. If true, control continues with 420. If false, control continues with 428 (FIG. 3B), which is discussed further below. The fourth predetermined maximum value corresponds to a maximum number of fail samples within the present set of the predetermined number of samples (Total Sample Size) for setting the DTC and entering the PDA mode. The fourth predetermined maximum value is one of the calibration values.

At 420, the diagnostic control module 202 sets the test status signal to the second state and sets the DTC associated with the fault. The diagnostic control module 202 sets the DTC in memory, such as memory 228 (FIG. 2). A malfunction indicator lamp (MIL) 232 (FIG. 2) is illuminated in response to the setting of the DTC to indicate a need for vehicle servicing. A vehicle service technician may use the DTC to fix the fault. The diagnostic control module 202 also sets the control mode 214 to the PDA mode and the permanent default action(s) are taken at 420. The diagnostic control module 202 also sets the last test fail signal to the first state at 420. Thus, if a next one of the samples is judged to be a fail sample at 316 during a next control loop, 360 increases computational efficiency by providing the ability to avoid unnecessary performance of additional processing for fail samples received consecutively after a determination that the PDA mode is to be used. Control continues with 424.

At 424, a metrics module 236 (FIG. 2) determines and selectively records a second metric then resets the fail sample counter ($X1^{CTR}$) and the total sample counter ($Y1^{CTR}$). If the TDA enabled signal is set to the first state, the following is also performed at 424: the metrics module 236 determines and selectively records third and fourth metrics; the diagnostic control module 202 fills the data buffer with indicators of fail samples, and the RIF counter ($RIF^{CTR}$) is updated to the size of the data buffer based on the filling; the counter/timer module 216 resets the TSLF counter ($TSLF^{CTR}$), the TDA counter ($TDA^{CTR}$), and the CIF counter ($CIF^{CTR}$); and the counter/timer module 216 stops and resets the TDA mode timer ($S2^{TMR}$).

The metrics module 236 determines the second, third, and fourth metrics using the relationships:

$$M2 = \left[1 - \frac{(TotalSampleSize - Y1^{CTR})}{(TotalSampleSize - S3DTCMAX)}\right] * 100;$$

$$M3 = \frac{TDA^{CTR}}{TDAMAX} * 100;$$

and $$M4 = \frac{TDA^{TMR}}{S2MAX} * 100,$$

where M2 is the second metric, M3 is the third metric, M4 is the fourth metric, TotalSampleSize is the predetermined number of samples of one set, $Y1^{CTR}$ is the value of the total sample counter, S3DTCMAX is the fourth predetermined maximum value, TDA counter is the value of the TDA counter, TDAMAX is the third predetermined maximum value, $TDA^{TMR}$ is the value of the TDA mode timer, and S2MAX is the predetermined maximum TDA period. The above relationships can be embodied as equations or as lookup tables.

If the second metric is greater than a previously stored value of the second metric, the metrics module 236 updates the stored value of the second metric at 424. If the third metric is greater than a previously stored value of the third metric, the metrics module 236 updates the stored value of the third metric at 424. If the fourth metric is greater than a previously stored value of the fourth metric, the metrics module 236 updates the stored value of the fourth metric at 424. In this manner, the metrics module 236 stores the maximum value of each of the second, third, and fourth metrics. Control returns to 308 after 424 for a next control loop.

Referring now to FIGS. 2 and 3B, the diagnostic control module 202 determines whether the following relationship is satisfied at 428:

$$(Y1^{CTR} - X1^{CTR}) > (TotalSamleSize - S3ExitMax),$$

where $Y1^{CTR}$ is the value of the total sample counter, $X1^{CTR}$ is the value of the fail sample counter, TotalSampleSize is the predetermined number of samples of one set, and S3ExitMax is a predetermined PDA exit value. The predetermined PDA exit value corresponds to a maximum value for exiting the PDA mode. The predetermined PDA exit value is one of the calibration values. If the relationship is satisfied, control continues with 432. If the relationship is not satisfied, control returns to 308 for a next control loop. This provides a computational efficiency gain in that, once it is realized that it is not possible to receive enough fail samples to set the DTC, latency is removed for indicating passing samples and for beginning processing of the next set of the predetermined number of samples.

At 432, the metrics module 236 determines and selectively updates a first metric. The metrics module 236 determines the first metric using the relationship:

$$M1 = \left(\frac{X1^{CTR}}{S3DTCMAX}\right) * 100,$$

where M1 is the first metric, $X1^{CTR}$ is the value of the fail sample counter, and S3DTCMAX is the fourth predetermined maximum value. If the first metric is greater than a previously stored value of the first metric, the metrics module 236 updates the stored value of the first metric. In this manner, the metrics module 236 also stores the maximum value of the first metric. The counter/timer module 216 also resets the fail sample counter ($X1^{CTR}$) and the total sample counter ($Y1^{CTR}$) at 432 after determining and selectively updating the first metric. Control continues with 436.

The diagnostic control module 202 determines whether the TDA enabled signal is in the first state at 436. If true, control continues with 440. If false, control continues with 456, which is discussed further below. At 440, the diagnostic control module 202 determines whether the TSLF counter ($TSLF^{CTR}$) is greater than or equal to the first predetermined TDA exit value (S2 Exit CIF MIN). If true, control continues with 444. If false, control returns to 308 for a next control loop. As stated above, the first predetermined TDA exit value corresponds to a minimum number of consecutive pass samples for transitioning from the TDA mode to the normal control mode.

The diagnostic control module 202 determines whether the RIF counter ($RIF^{CTR}$) is less than the second predetermined TDA exit value (S2 Exit RIF MAX) at 444. If true, control continues with 452. If false, control returns to 308 for a next control loop. As stated above, the second predetermined TDA exit value corresponds to a maximum number of fail samples within the data buffer (i.e., a maximum value of the RIF counter) for transitioning from the TDA mode to the normal control mode. At 452, the metrics module 236 determines the second and third metrics. Determination of the second and third metrics is discussed above. If the second metric is greater than the stored value of the second metric, the metrics module 236 updates the stored value of the second metric to the determined value of the second metric at 452. The same is true for the third metric if the third metric is greater than the stored value of the third metric. At 454, the diagnostic control module 202 fills the data buffer with indicators of pass samples, and the RIF counter ($RIF^{CTR}$) is set to zero based on the filling. The TSLF counter ($TSLF^{CTR}$) is also reset at 454. Control continues with 456 after 454.

At 456, the diagnostic control module 202 sets the test status signal to the first state and sets the last test pass signal to the first state. Thus, if a next one of the samples is judged to be a pass sample at 316 during a next control loop, 320 increases computational efficiency by providing the ability to avoid unnecessary performance of additional processing for pass samples received consecutively after a determination that the normal control mode is to be used. Control continues with 460 after 456.

The diagnostic control module 202 determines whether the control mode 214 is the PDA mode at 460. If true, the diagnostic control module 202 transitions the control mode 214 to the normal control mode, initiates normal control of the control system, and clears the DTC at 464. If false, control returns to 308 for a next control loop. The clearing of the DTC may include setting the DTC to a not current state to indicate that the DTC was previously set. The MIL 232 may be disabled when the DTC is in the not current state. Control continues with 468. At 468, if the first metric is greater than zero, the metrics module 236 resets the first metric to zero. Control then returns to 308 for a next control loop.

The above allows hysteresis between pass and fail criteria for entering and exiting the TDA mode and/or for setting and clearing the DTC (via the calibration values) if desired. For example, if no hysteresis is desired, the predetermined PDA exit value (S3ExitMax) should be set (calibrated) equal to the fourth predetermined maximum value (S3 DTC MAX), the first predetermined TDA exit value (S2 Exit CIF MIN) should be set equal to the first predetermined maximum value (S1 CIF MAX), and the second predetermined TDA exit value (S2 Exit RIF MAX) should be set equal to the second predetermined maximum value (S1 RIF Max).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A diagnostic system for diagnosing a device of a vehicle, comprising:
   a first electronic circuit configured to generate samples of a parameter of the device;
   a second electronic circuit configured to indicate whether each of the samples passed or failed based on comparisons of the samples with one of a predetermined value and a predetermined range;
   a third electronic circuit configured to track a first number of consecutive samples compared, to track a second number of the first number of samples that failed, to track a third number of the first number of samples that failed consecutively, and to track a fourth number of a last predetermined number of samples compared that failed,
   wherein the second electronic circuit is further configured to:
      select one of a normal control mode, a temporary default action mode and a permanent default action mode based on the first, second, third, and fourth numbers;
      transition from the normal control mode to the temporary default action mode and takes a temporary default action based on at least one of the third and fourth numbers;
      transition to the permanent default action mode and takes a permanent default action based on at least one of the first, third, and fourth numbers; and
      selectively set a diagnostic trouble code (DTC) in memory when in the permanent default action mode.

2. The diagnostic system of claim 1 further comprising a malfunction indicator lamp (MIL) that illuminates when the DTC is set.

3. The diagnostic system of claim 1 wherein the permanent default action is different than the temporary default action.

4. The diagnostic system of claim 1 wherein:
   the third electronic circuit is further configured to track a period of operation in the temporary default action mode; and
   the second electronic circuit is configured to transition to the permanent default action mode and to take the permanent default action in response to a determination that the period is greater than a predetermined period.

5. The diagnostic system of claim 1 wherein:
   the third electronic circuit is further configured to track a fifth number of transitions from the normal control mode to the temporary default action mode; and
   the second electronic circuit is configured to transition to the permanent default action mode and to take the permanent default action in response to a determination that the fifth number is greater than a predetermined value.

6. The diagnostic system of claim 1 wherein the second electronic circuit is configured to transition to the permanent default action mode and to take the permanent default action in response to a determination that the second number is greater than a predetermined value.

7. The diagnostic system of claim 1 wherein:
   the third electronic circuit is further configured to track a period of operation in the temporary default action mode and to track a fifth number of transitions from the normal control mode to the temporary default action mode; and
   the second electronic circuit is configured to transition to the permanent default action mode and to take the permanent default action in response to:
      a first determination that the period is greater than a predetermined period;
      a second determination that the fifth number is greater than a first predetermined value; and
      a third determination that that the second number is greater than a second predetermined value.

8. The diagnostic system of claim 1 wherein the second electronic circuit is configured to transition to the temporary default action mode and to take the temporary default action in response to a determination that the third number is greater than a predetermined value.

9. The diagnostic system of claim 8 wherein the second electronic circuit is configured to transition to the temporary default action mode and to take the temporary default action further in response to a second determination that the fourth number is greater than a second predetermined value.

10. The diagnostic system of claim 8 wherein:
   the third electronic circuit is further configured to track a fifth number of samples compared since a last failed sample; and
   the second electronic circuit is configured to transition from the temporary default action mode to the normal control mode in response to a third determination that both:
      the fifth number is greater than a third predetermined value; and
      the fourth number is less than a fourth predetermined value.

11. A method, performed by an electronic circuit, for diagnosing a device of a vehicle, comprising:
   generating samples of a parameter of the device;
   indicating whether each of the samples passed or failed based on comparisons of the samples with one of a predetermined value and a predetermined range;
   tracking a first number of consecutive samples compared, a second number of the first number of samples that failed, a third number of the first number of samples that failed consecutively, and a fourth number of a last predetermined number of samples compared that failed;
   selecting one of a normal control mode, a temporary default action mode and a permanent default action mode based on the first, second, third, and fourth numbers;
   transitioning from the normal control mode to the temporary default action mode and taking a temporary default action based on at least one of the third and fourth numbers;
   transitioning to the permanent default action mode and taking a permanent default action based on at least one of the first, third, and fourth numbers; and
   selectively setting a diagnostic trouble code (DTC) in memory when in the permanent default action mode.

12. The method of claim 11 further comprising illuminating a malfunction indicator lamp (MIL) when the DTC is set.

13. The method of claim 11 wherein the permanent default action is different than the temporary default action.

14. The method of claim 11 further comprising:
   tracking a period of operation in the temporary default action mode; and
   transitioning to the permanent default action mode and taking the permanent default action in response to a determination that the period is greater than a predetermined period.

15. The method of claim 11 further comprising:
   tracking a fifth number of transitions from the normal control mode to the temporary default action mode; and transitioning to the permanent default action mode and taking the permanent default action in response to a determination that the fifth number is greater than a predetermined value.

16. The method of claim 11 further comprising transitioning to the permanent default action mode and taking the permanent default action in response to a determination that the second number is greater than a predetermined value.

17. The method of claim 11 further comprising:
tracking a period of operation in the temporary default action mode;
tracking a fifth number of transitions from the normal control mode to the temporary default action mode; and
transitioning to the permanent default action mode and taking the permanent default action in response to:
  a first determination that the period is greater than a predetermined period;
  a second determination that the fifth number is greater than a first predetermined value; and
  a third determination that that the second number is greater than a second predetermined value.

18. The method of claim 11 further comprising transitioning to the temporary default action mode and taking the temporary default action in response to a determination that the third number is greater than a predetermined value.

19. The method of claim 18 further comprising transitioning to the temporary default action mode and taking the temporary default action further in response to a second determination that the fourth number is greater than a second predetermined value.

20. The method of claim 18 further comprising:
tracking a fifth number of samples compared since a last failed sample; and
transitioning from the temporary default action mode to the normal control mode in response to a third determination that both:
  the fifth number is greater than a third predetermined value; and
  the fourth number is less than a fourth predetermined value.

21. The diagnostic system of claim 1 wherein the first, second, and third electronic circuits include or are a part of at least one of: an application specific integrated circuit (ASIC); a discrete circuit; an integrated circuit; a combinational logic circuit; a field programmable gate array; and a processor and memory including code.

* * * * *